Feb. 14, 1933.   J. P. SEISER   1,897,769
SEEDER
Filed Oct. 24, 1930
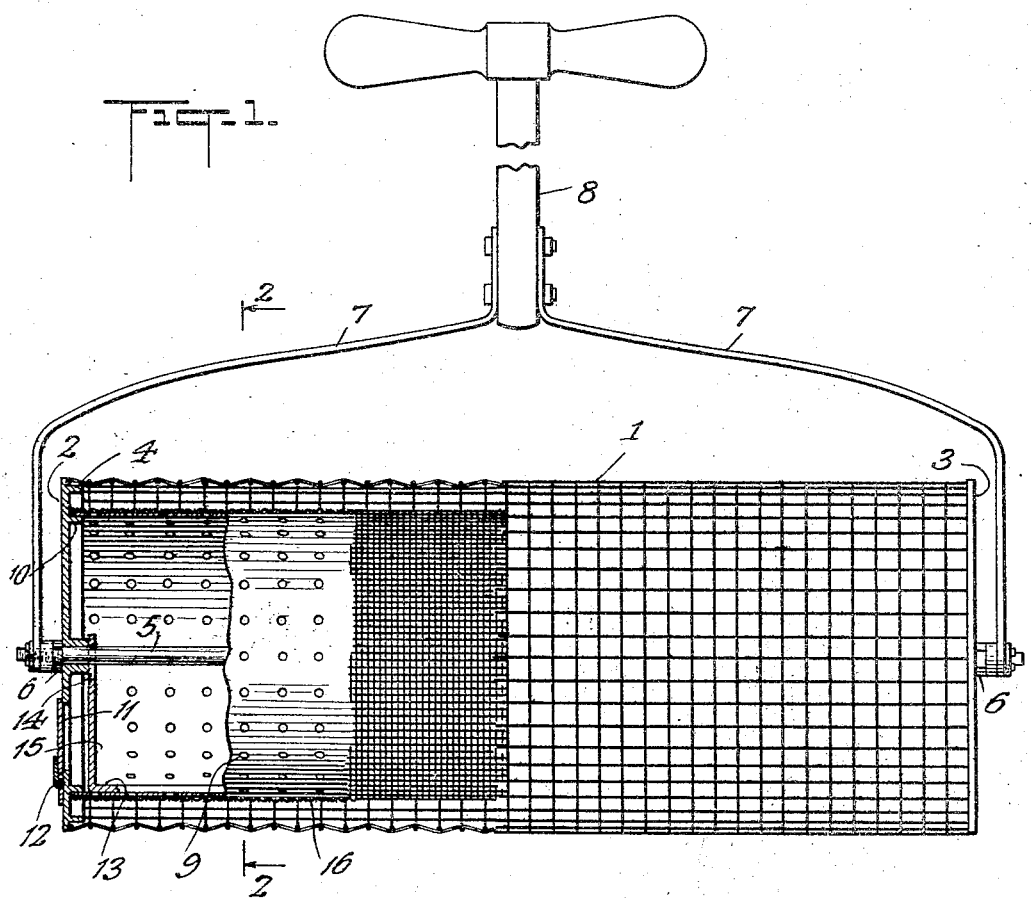
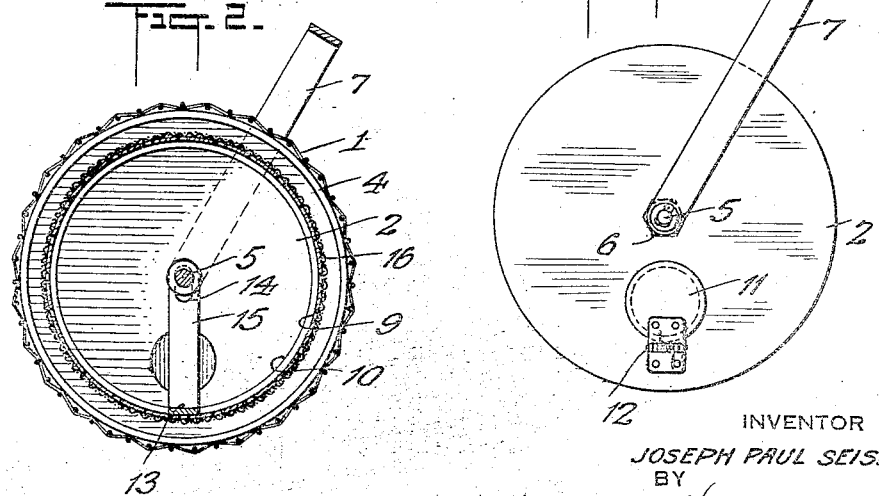
INVENTOR
JOSEPH PAUL SEISER.
BY
ATTORNEY Patented Feb. 14, 1933

1,897,769

UNITED STATES PATENT OFFICE

JOSEPH PAUL SEISER, OF WHITE PLAINS, NEW YORK

SEEDER

Application filed October 24, 1930. Serial No. 490,843.

Commonly, seed that is sown broadcast, such, for instance, as grass seed or buckwheat, is scattered over the surface of the soil which has previously been softened by ploughing. The seed so sown is left to the action of the elements as the rain and wind to be embedded in the soil to take root therein. This manner of sowing makes it difficult to obtain an even distribution of the seed, and is conducive to a waste of the seed because all of the seed is not embedded in the soil to take root therein, and it is to a device for sowing such seed that my invention relates.

An object of my invention is to provide a device that will evenly distribute the seed over the soil and embed the seed in the soil. Another object of my invention is to provide a device that will distribute the seed over the soil and embed the seed in the soil simultaneously. A further object of my invention is to provide a device for sowing seed, which is simple in construction and operation, and which is comparatively inexpensive to manufacture.

I accomplish the objects of my invention by providing a foraminous member for turning over the soil and embedding the seed therein. In conjunction with this foraminous member, there is provided a means for distributing the seed on to the foraminous member. The foraminous member, as it passes over the soil, sinks into the soil and turns over the soil projecting through the foraminations. Seed is distributed on the foraminous member and passes through the foraminations thereof and are embedded in the soil that is turned over by the foraminous member.

Specifically, my device comprises a coarse wire woven drum which is adapted to be rolled over the soil. As the drum passes over the soil, it sinks into the soil and movement of the drum turns over the soil protruding through the spaces in the woven wire drum. Within the drum, there is a cylindrical magazine for holding a supply of seed. The periphery of the magazine is perforated to permit the seed contained therein to pass therethrough. Surrounding the cylindrical magazine, there is a fine mesh wire woven cylinder which covers the perforations in the magazine and serves to control the flow of seed from the magazine and distributes the seed over the soil. Seed passing through the perforations in the magazine passes through the spaces in the wire drum and is embedded in the soil as the soil is turned over by the drum.

The invention will be more clearly understood from the following particular description of an embodiment thereof, which is shown in the accompanying drawing, in which:

Fig. 1 is an elevation, partly in section, of a seeder constructed in accordance with my invention;

Fig. 2 is a transverse section taken on the line 2—2 of Fig. 1; and

Fig. 3 is an end view of the seeder.

The embodiment shown in the drawing, which is designed for sowing lawns with grass seed, comprises a coarse woven wire drum 1 which is closed at each end by discs 2 and 3 having lateral flanges 4 to which the woven wire is secured. For sowing grass seed, the woven wire drum is preferably constructed from 5/8" square mesh wire cloth. The drum 1 is mounted upon an axle 5 which extends beyond the ends of the drum, and it is secured in place on the axle 5 by nuts 6 threaded on each end of the axle and abutting against the end discs 2 and 3 of the drum. The axle 5 is journaled in bales 7 which are secured to a handle 8 by means of which the drum may be drawn or pushed over the soil. As the drum passes over the soil, the soil having been previously loosened and granulated, the drum sinks into the soil and agitates the loose ground as the drum rolls over it. Seed distributed upon the inner surface of the drum passes through the drum, and is largely covered over by the loose ground due to the agitating action of the drum.

Seed is supplied through the drum from a magazine which comprises a sheet metal cylinder 9 secured at its ends to lateral flanges 10 on the end discs 2 and 3, and hence rotative with the drum. The walls of this sheet metal cylinder 9 are perforated. In the lawn seeder shown, there is a single perforation in each square inch of the surface of the cylinder. The size and number of the perforations will vary with the seed to be sown and in sowing lawn grass seed a perforation of 3/16" in diameter is found to give excellent results. Seed may be introduced into the magazine through a door 11 covering an opening through the end piece 2. The door 11 is equipped with a spring hinge 12 to urge it to closed position.

Within the magazine there is provided an agitator 13. The agitator consists of a U-shaped metal bar which extends across the entire length of the cylinder 9 and which is suspended from the axle 5 which extends through slots 14 in the arms 15 of the agitator. As the seeder rolls over the surface of the ground the seed in the magazine will lift the agitator angularly until gravity overcomes the frictional lift of the seed, whereupon the agitator falls to vertical position. Instantly the drag of the seed starts to lift it again until it again falls by gravity, and this oscillatory movement of the agitator continues regularly and serves to stir or agitate the seed and influence its uniform escape through the perforations of the magazine. The arms of the agitator are provided with the slots 14 so that the agitator may move perpendicularly to the axle 5 as well as swing on the axle. This free movement of the agitator, perpendicularly to the shaft 5, prevents the agitator from becoming locked to the cylinder by wedging action of the seed. The flow of seed through the perforations and the distribution of the seed flowing therethrough is controlled by a distributor 16.

The distributor 16 consists of a fine woven wire cloth or screen which covers the entire outer surface of the cylinder 9, and is secured thereto. The mesh of the screen 16 is such that approximately one seed may pass through a mesh opening at a time. In a lawn seeder, this woven wire cloth or screen 16 may be what is commonly known as a 14-mesh screen. Seed passing through the perforations in the cylinder 9 is distributed by the woven wire cloth 16, and passes through the cloth and falls upon the ground and is covered over by the action of the drum.

It is obvious that various changes may be made in the details of the embodiment shown in the drawing and described above by those skilled in the art within the principle and scope of my invention as expressed in the appended claims.

I claim:

1. A seeder comprising a foraminous member adapted to contact with the soil for turning over the soil and embedding seeds passing therethrough in the soil, and means for distributing seed over the foraminous member.

2. A seeder comprising a foraminous drum adapted to contact with the soil for turning over the soil and embedding seeds passing therethrough in the soil, and means for distributing seed over the inner surface of the drum.

3. A seeder comprising a woven wire drum adapted to contact with the soil for turning over the soil and embedding seed passing therethrough in the soil, and means for distributing seed over the inner surface of the drum.

4. A seeder comprising a foraminous drum for turning over the soil and embedding seed passing therethrough in the soil, and a cylindrical magazine within said foraminous drum for holding a supply of seed, the periphery of said magazine being perforated for supplying seed to be embedded in the soil by the foraminous drum.

5. A seeder comprising a foraminous drum for turning over the soil and embedding seed passing therethrough in the soil, a cylindrical magazine within said foraminous drum for holding a supply of seed, the periphery of the magazine being perforated for supplying seed to be embedded in the soil by the foraminous drum, and a foraminous cylinder surrounding said magazine and covering the perforations therein.

6. A seeder comprising a woven wire drum for turning over the soil and embedding seed passing therethrough in the soil, a cylindrical magazine within said drum for holding a supply of seed, the periphery of the magazine being perforated for supplying seed to be embedded in the soil and a woven wire cylinder surrounding said magazine and covering the perforations therein.

7. A seeder comprising a woven wire drum for turning over the soil and embedding seed passing therethrough in the soil, a cylindrical magazine within said drum for holding a supply of seed, the periphery of the magazine being perforated for supplying seed to be embedded in the soil, and a woven wire cylinder surrounding said magazine and covering the perforations therein, the mesh of the woven wire cylinder being finer than the mesh of the drum.

8. A seeder comprising a woven wire drum for turning over the soil and embedding seed passing therethrough in the soil, a cylindrical magazine within said drum for holding a supply of seed, the periphery of the magazine being perforated for supplying seed to be embedded in the soil, an agitator in the magazine, and a woven wire cylinder surrounding said magazine and covering the perforations therein, the mesh of the cylinder being finer than the mesh of the drum.

In witness whereof, I hereunto subscribe my signature.

JOSEPH PAUL SEISER.